(12) United States Patent
Bares et al.

(10) Patent No.: US 7,849,941 B2
(45) Date of Patent: Dec. 14, 2010

(54) UNIVERSAL LINKAGE ASSEMBLY FOR A POWER MACHINE

(75) Inventors: Mark F. Bares, Oakes, ND (US); Ryan J. Dotzenrod, Lakeville, MN (US)

(73) Assignee: Clark Equipment Company, West Fargo, ND (US)

( * ) Notice: Subject to any disclaimer, the term of this patent is extended or adjusted under 35 U.S.C. 154(b) by 664 days.

(21) Appl. No.: 11/545,217

(22) Filed: Oct. 10, 2006

(65) Prior Publication Data

US 2008/0083570 A1   Apr. 10, 2008

(51) Int. Cl.
*B62D 7/00*   (2006.01)
(52) U.S. Cl. .................. 180/6.32; 180/6.2; 180/6.48
(58) Field of Classification Search ............ 180/6.2, 180/6.32, 6.48
See application file for complete search history.

(56) References Cited

U.S. PATENT DOCUMENTS

| | | | | |
|---|---|---|---|---|
| 3,251,429 A * | 5/1966 | Harms | ................ | 180/6.2 |
| 3,388,821 A * | 6/1968 | White, Jr. | ................ | 414/715 |
| 3,567,051 A * | 3/1971 | Bell | ................ | 414/739 |
| 3,850,258 A | 11/1974 | Bauer | ................ | 180/6.48 |
| 3,893,346 A | 7/1975 | Paul | ................ | 74/471 |
| 3,910,133 A | 10/1975 | Oestmann | ................ | 74/479 |
| 4,027,547 A | 6/1977 | Rahman et al. | ................ | 74/471 |
| 4,085,812 A | 4/1978 | Robinson et al. | ................ | 180/6.48 |
| 4,090,411 A * | 5/1978 | Albright et al. | ................ | 74/471 XY |
| 4,299,137 A * | 11/1981 | Malecha | ................ | 74/512 |
| 4,327,599 A | 5/1982 | Friede | ................ | 74/483 |
| 4,706,776 A * | 11/1987 | Hyoki et al. | ................ | 180/334 |
| 4,736,647 A * | 4/1988 | Shimoie et al. | ................ | 74/471 XY |
| 5,232,057 A | 8/1993 | Renard | ................ | 172/812 |
| 5,553,992 A * | 9/1996 | Ashcroft | ................ | 414/685 |
| 6,213,244 B1 | 4/2001 | Waggoner et al. | ................ | 180/333 |
| 6,289,783 B1 * | 9/2001 | Sagaser et al. | ................ | 91/427 |
| 6,389,922 B1 | 5/2002 | Krieger | ................ | 74/491 |
| 6,581,704 B2 * | 6/2003 | Law et al. | ................ | 180/6.32 |
| 6,655,229 B2 | 12/2003 | Yamamoto et al. | ................ | 74/471 |
| 6,722,224 B2 | 4/2004 | Nordstrom | ................ | 74/471 |
| 7,270,201 B1 * | 9/2007 | Cryer | ................ | 180/19.2 |

FOREIGN PATENT DOCUMENTS

JP   61072137   4/1986

OTHER PUBLICATIONS

"Partial European Search Report" for Application No. 07117302.5-2316/1911891 date Jul. 7, 2009; 8 pages.
"Extended European Search Report" for Application No. 07117302.5-2316/1911891 date Sep. 23, 2009; 12 pages.
Partial Translation of Japanese Laid-Open Publication No. 61-72137, pp. 1-5.

\* cited by examiner

*Primary Examiner*—Paul N Dickson
*Assistant Examiner*—Maurice Williams
(74) *Attorney, Agent, or Firm*—Westman, Champlin & Kelly, P.A.

(57) ABSTRACT

A universal linkage assembly for a power machine is disclosed. The universal linkage is adaptable for different control configurations or patterns. For example, in embodiments disclosed, the linkage assembly includes a first control interface connectable to one of a first or second joysticks to operate one of a left or right drive motor or other function and a second control interface connectable to either the first or second joystick to operate the other of the left or right drive motor or other function with separate joysticks or the same joystick depending upon the control pattern desired.

20 Claims, 14 Drawing Sheets

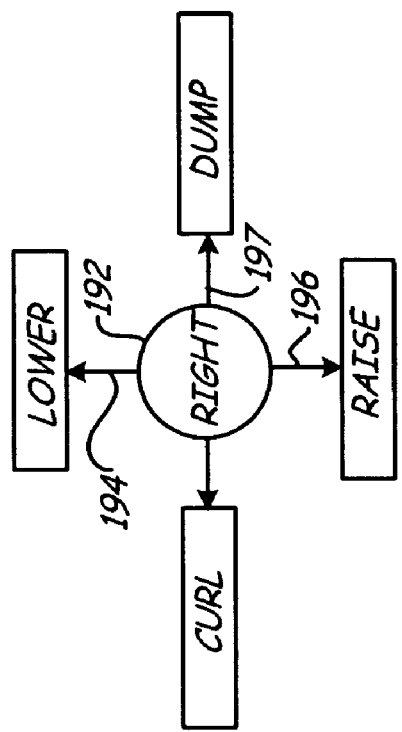
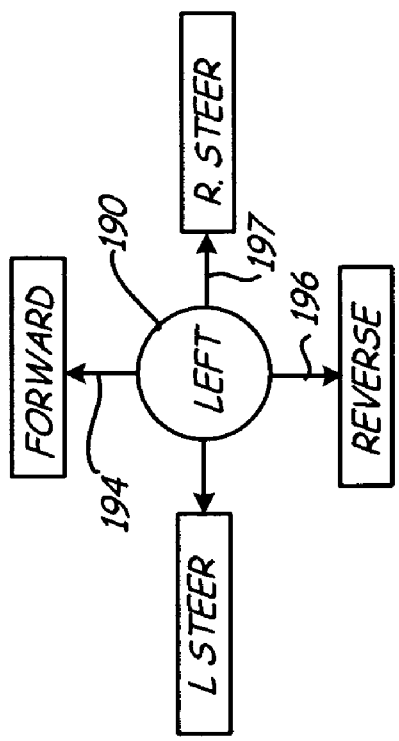
Fig. 3

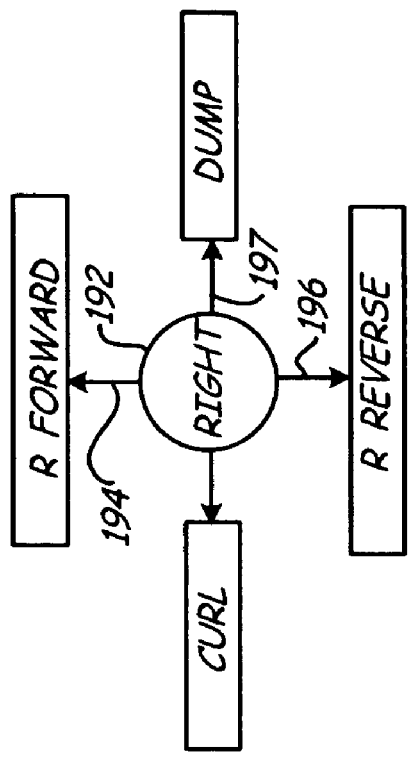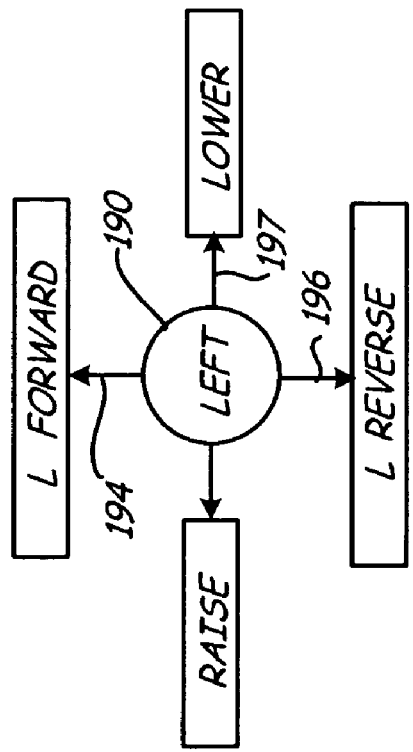
Fig. 4

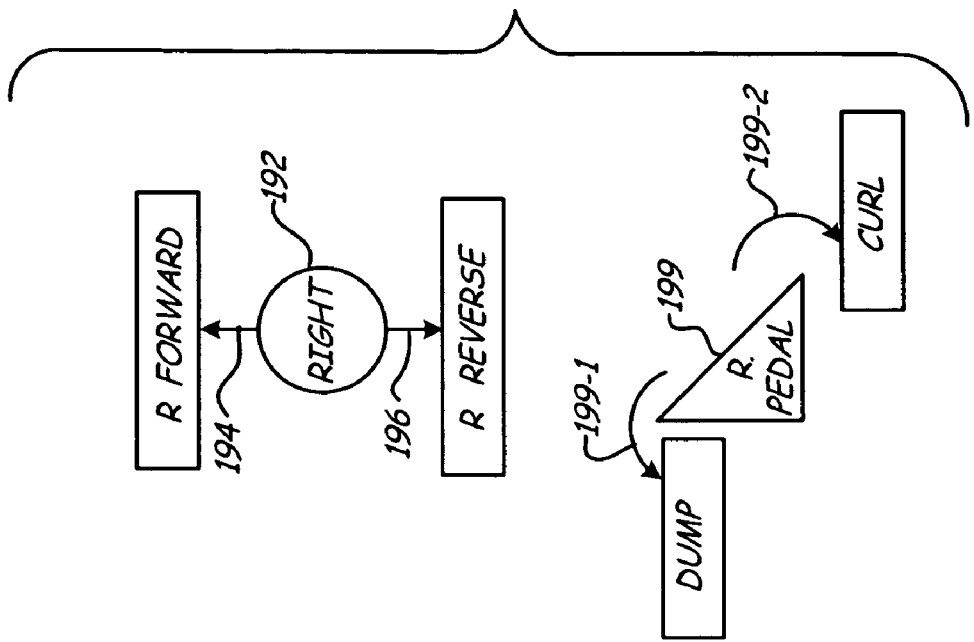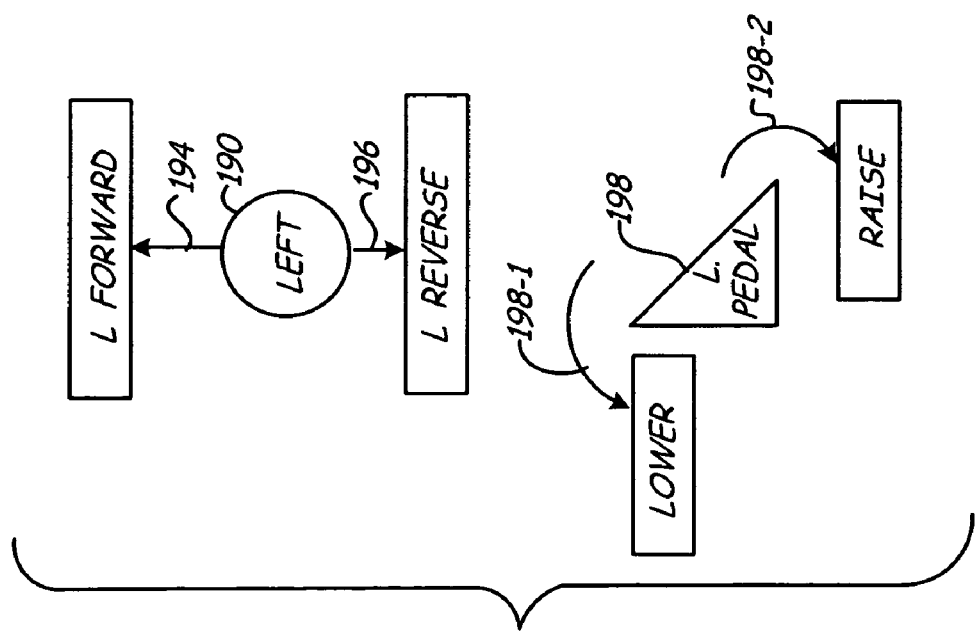
Fig. 5

UNIVERSAL LINKAGE ASSEMBLY FOR A POWER MACHINE

BACKGROUND OF THE INVENTION

Power machines, such as skid steer loaders compact tool carries, diggers or other power machines are used for a wide variety of applications including for example construction, landscaping and other applications. Typically power machines are driven or operated using various hand levers, joysticks or other controls. For example, power machines can include joysticks to drive, steer and/or operate or control different attachments or implements. Joysticks can have different control patterns for operating the machine. Standard control patterns include for example, ISO pattern or H-control pattern. Different users can prefer different operating patterns depending upon user preference or training and prefer mechanical control systems over electric control systems. The present invention addresses these and other issues and provides advantage over prior operating control systems for a power machine or vehicle.

SUMMARY OF THE INVENTION

The present invention relates to a universal linkage assembly that is adaptable for different control patterns or configurations. For example in illustrated embodiments, the linkage assembly includes a first control interface connectable to a first joystick to operate one of a left or right drive motor or other function and a second control interface connectable to either the first joystick or a second joystick to operate the other of the left or right drive motor or other function depending upon the control pattern desired. The invention as disclosed provides advantages over prior linkage assemblies that could not be easily adapted for different control patterns.

BRIEF DESCRIPTION OF THE DRAWINGS

FIGS. 3-4 are schematic illustrations of operating control patterns for left and right joysticks for a power machine or vehicle of the type illustrated in FIG. 1.

FIG. 5 is a schematic illustration of an operating control pattern for left and right joysticks and left and right foot pedals for a power machine or vehicle of the type illustrated in FIG. 1.

DETAILED DESCRIPTION OF ILLUSTRATIVE EMBODIMENTS

Figure 1:
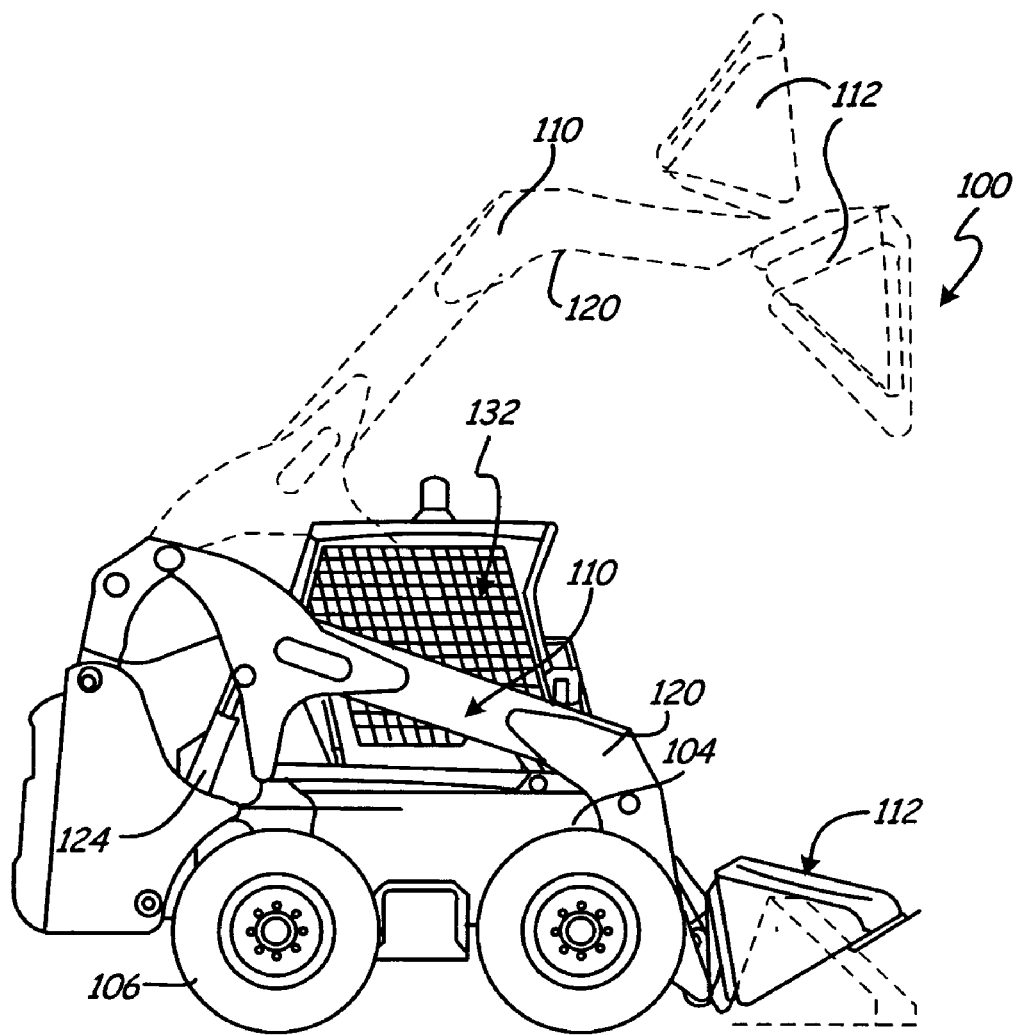
FIG. 1 is a side view of an embodiment of a power machine in which a universal linkage assembly is used.

FIG. 1 illustrates an embodiment of a power machine or vehicle 100 in which embodiments of the universal linkage disclosed herein can be incorporated or used. As shown, the illustrated power machine includes a body 104 that is supported relative to a frame (not shown). Wheels 106 are coupled to the frame so that the power machine 100 or vehicle can be driven over the ground during use. Application, however, of the present invention is not limited to a wheeled vehicle or loader as shown. For example, the present invention has application for a power machine, which moves along a track instead of wheels.

As shown in FIG. 1, the illustrated power machine 100 includes a boom assembly 110 that is used to raise, lower or position a work implement or attachment 112, (which in the illustrated embodiment is a bucket). The boom assembly 110 includes lift arms 120 (only one of which is shown in FIG. 1). Lift arms 120 are pivotally coupled to the body 104 of the machine to raise and lower the attachment 112. Hydraulic cylinders or actuators 124 (only one shown in FIG. 1) are coupled to the body 104 and lift arms 120 to raise and lower the lift arms 120. In FIG. 1, the boom assembly 110 is shown in the lowered position and shown in the raised position in phantom.

The attachment or implement 112 is rotationally coupled to the lift arms 120 so that an orientation of the implement 112 can be adjusted relative to the lift arms 120. Implement 112 is rotationally adjusted or tilted via a tilt cylinder (not shown in FIG. 1). The tilt cylinder is extended and retracted to adjust the orientation or tilt (e.g. curl or dump position) of the attachment or implement 112.

Although FIG. 1 illustrates a bucket attachment or implement, application is not limited to a bucket and other implements can be attached to the lift arms 120 or machine depending upon the particular work application. For example, lift arms 120 of the power machine can support a spade or other implement.

Figure 2:
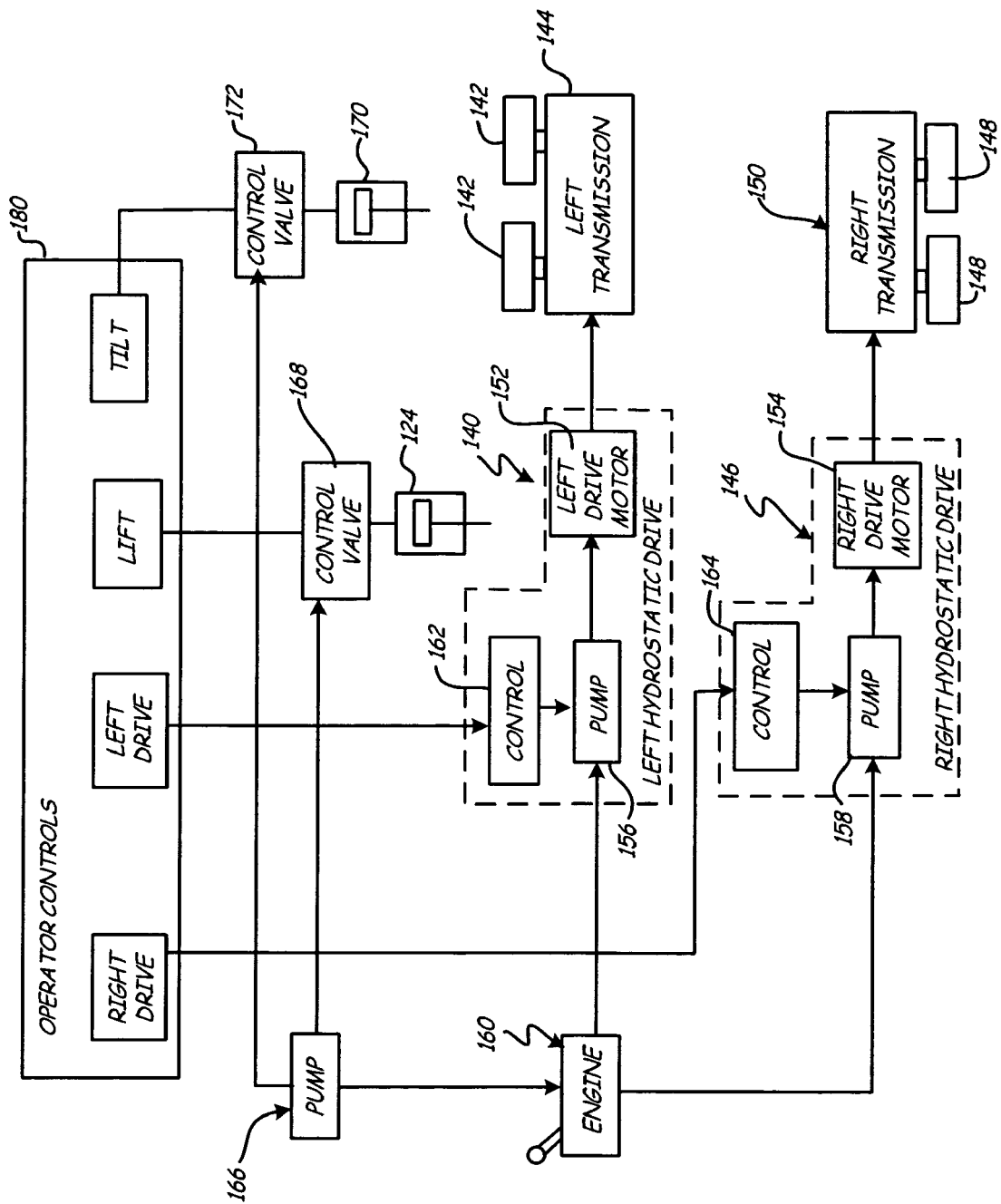
FIG. 2 is a schematic illustration of illustrative operating components or functions of the power machine of FIG. 1.

As schematically shown in the embodiment illustrated in FIG. 2, the power machine is driven and steered through a hydrostatic drive assembly or system which transmits power to wheels 106 of the power machine. In the illustrated embodiment shown, the hydrostatic drive assembly includes a left hydrostatic drive 140 that transmits torque or power to left wheels 142 (illustrated schematically) through a left drive transmission 144 and a right hydrostatic drive 146 that transmits torque or power to the right wheels 148 through the right drive transmission 150.

The left and right drives 140, 146 include left and right hydrostatic drive motors 152, 154. Fluid is supplied to the left and right drive motors 152, 154 from left and right pumps 156, 158 operated via engine 160. In the illustrated embodiment, the hydrostatic drives 140, 142 include a variable displacement pumps 156, 158 operable via controls (or swashplate) 162, 164. Control 162 controls the magnitude and direction of fluid flow from pump 156 to the left drive motor 154 to operate the left wheels and control (or swashplate) 164 controls the magnitude and direction of fluid flow to the right drive motor 152 to operate the right wheels 148. Fluid is provided to both left and right drive motors 152, 154 to power left and right wheels for forward and aft motion. Steer motion is imparted to the power machine by providing fluid flow to one of the left or right drive motors 152, 154 to provide a skid steer motion to the power machine.

As previously described, the lift function is operated through hydraulic actuator or cylinder 124. Hydraulic fluid is supplied from pump 166 powered via engine 160 to the lift cylinder 124 through operation of control or servo valve 168 as schematically shown in FIG. 2. Similarly fluid is supplied from pump 166 to a tilt cylinder 170 through operation of servo or control valve 172 to adjust an orientation of an implement or attachment.

The direction and magnitude of flow to the left and right drive motors 152, 156 and lift and tilt cylinders 124, 170 is controlled based upon input from operator controls 180 of the power machine. Operator controls 180 include various levers, pedal, and/or joysticks that allow the user to move the power machine or vehicle in a forward direction, reverse direction and/or steer the machine or vehicle as well as control or operate implements or attachments of the power machine. In the illustrated embodiment, operating controls 180 include left and right drive functions and lift and tilt control functions that operate controls and/or valves 162, 164, 168, 172 to supply hydraulic fluid flow to the various actuators or drive motors.

Alternate hydrostatic drive assemblies include a fixed displacement pumps and variable displacement motors or fixed displacement pumps and motors where the magnitude and direction of fluid flow is regulated through a control valve. Alternate embodiments of the present invention can be implemented for alternate hydrostatic drive assemblies and application is not limited to a variable displacement pump and fixed displacement motor as described.

Different power machines have different operator control designs or patterns. FIG. 3 illustrates one control pattern using left and right joysticks 190, 192 configured to drive, steer and activate lift and tilt functions of the power machine. As shown, both joystick 190, 192 are operable in a forward direction 194, reverse direction 196 and transverse direction 197.

The left joystick 190, in the embodiment illustrated in FIG. 3, is configured for drive and steer functions and the right joystick 192 is configured to control lift and tilt functions for an attachment or implement. Movement of the left joystick 190 in the forward and aft directions 194, 196 moves the machine in forward and reverse directions, respectively and movement of the left joystick 190 in the transverse direction 197 provides left and right steer motion through operation of the left and right drive motors 152, 154.

The right joystick 192 is arranged so that forward and aft movement raises and lowers the lift arms 120 and transverse movement in the traverse direction 197 adjusts the tilt of the attachment or bucket through the tilt cylinder or cylinders 170.

FIG. 4 illustrates another operator control design or pattern. The illustrated pattern is an H control pattern where both left and right joysticks 190, 192 are used to cooperatively drive and steer the power machine or vehicle. As shown, movement of the left joystick 190 in the forward and aft directions 194, 196 controls the left drive motor 152 and forward and aft movement of the right joystick 192 controls right drive motor 154.

Thus, both joysticks 190, 192 are moved forward and aft to impart forward and reverse motion to the power machine. Steer input is provided by forward or aft movement of one or either of the joysticks 190, 192 to impart drive or movement to one side (wheels 142) or the other side (wheels 148) of the power machine depending upon the steer direction. Transverse movement of the left joystick 190 in the traverse direction 197 is used to raise and lower the lift arms 120 and transverse movement of the right joystick 192 in the traverse direction 197 is used to control or adjust tilt of the attachment or bucket 112 as previously described.

FIG. 5 illustrates another operator control pattern for left and right joysticks 190, 192 and left and right foot pedals 198, 199. As shown, movement of joysticks 190, 192 in the forward and aft directions 194, 196 cooperatively drives and steers the power machine as previously described for the operating control pattern illustrated in FIG. 4. In the embodiment shown in FIG. 5, lift and tilt functions are controlled via the left and right foot pedals 198, 199.

In particular, depression of left foot pedal 198 as illustrated by arrow 198-1 lowers the lift arms 120 or implement and depression of the right foot pedal 199 as illustrated by arrow 199-1 dumps the bucket or other implement. Release of the left foot pedal 198 as illustrated by arrow 198-2 raises the lift arms 120 or implement and release of the right foot pedal 199 as illustrated by arrow 199-2 curls the bucket or other implement.

Different control patterns require different linkages to connect the operator controls 180 to various machine controls or valves (e.g. 162, 164, 168, 172) to implement the selected function or functions. For example, in FIG. 3 drive and steer functions are 4, both joysticks 190, 192 are used to cooperatively controlled through the left joystick 190 while in FIG. drive and steer the power machine or vehicle. FIGS. 5-13 illustrate a universal linkage assembly 200 that is adaptable for different operator control designs or control patterns, such as the patterns illustrated in FIGS. 3-5.

Figure 6:
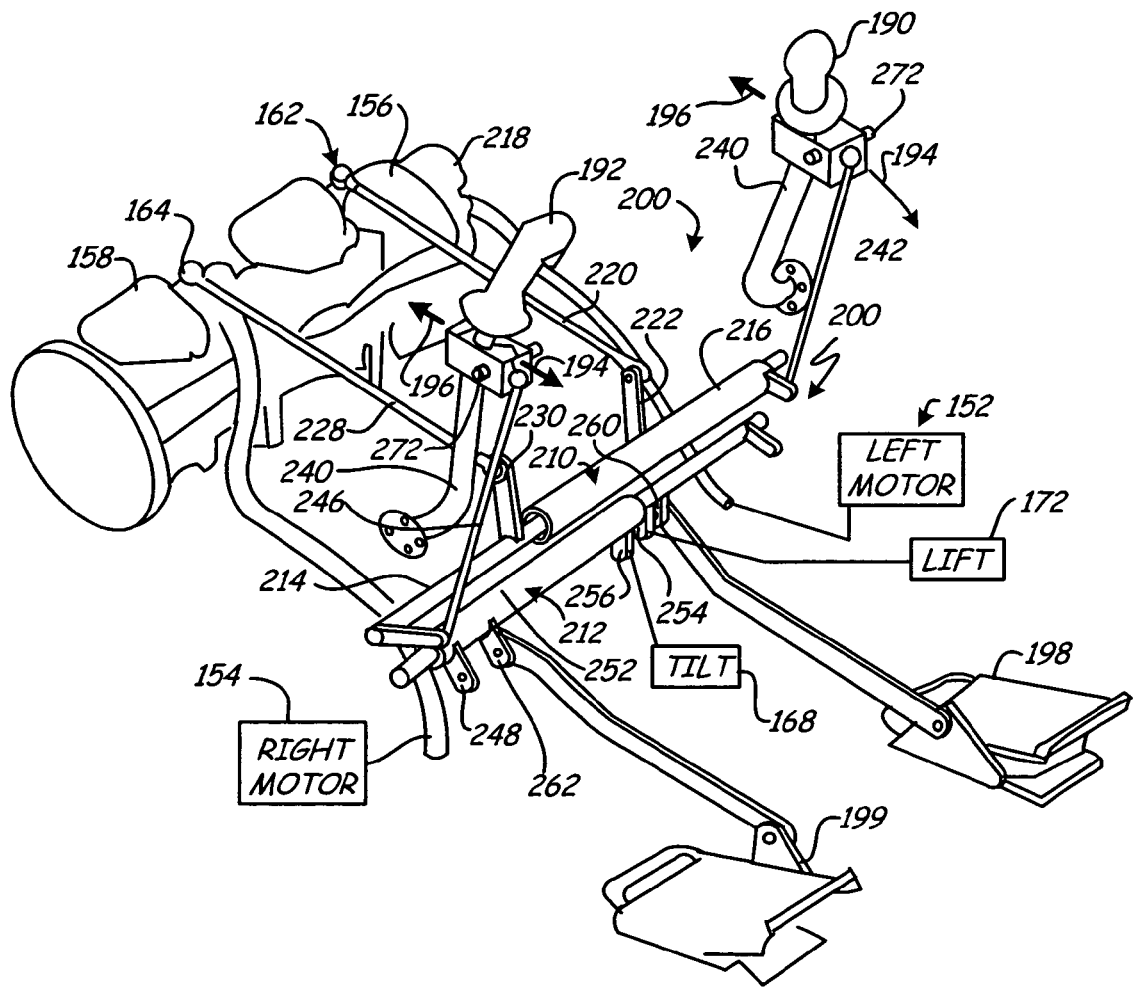
FIGS. 6-8 illustrate an embodiment of a universal linkage assembly adapted to implement a control pattern using right and left joysticks and right and left foot pedals.
Figure 7:
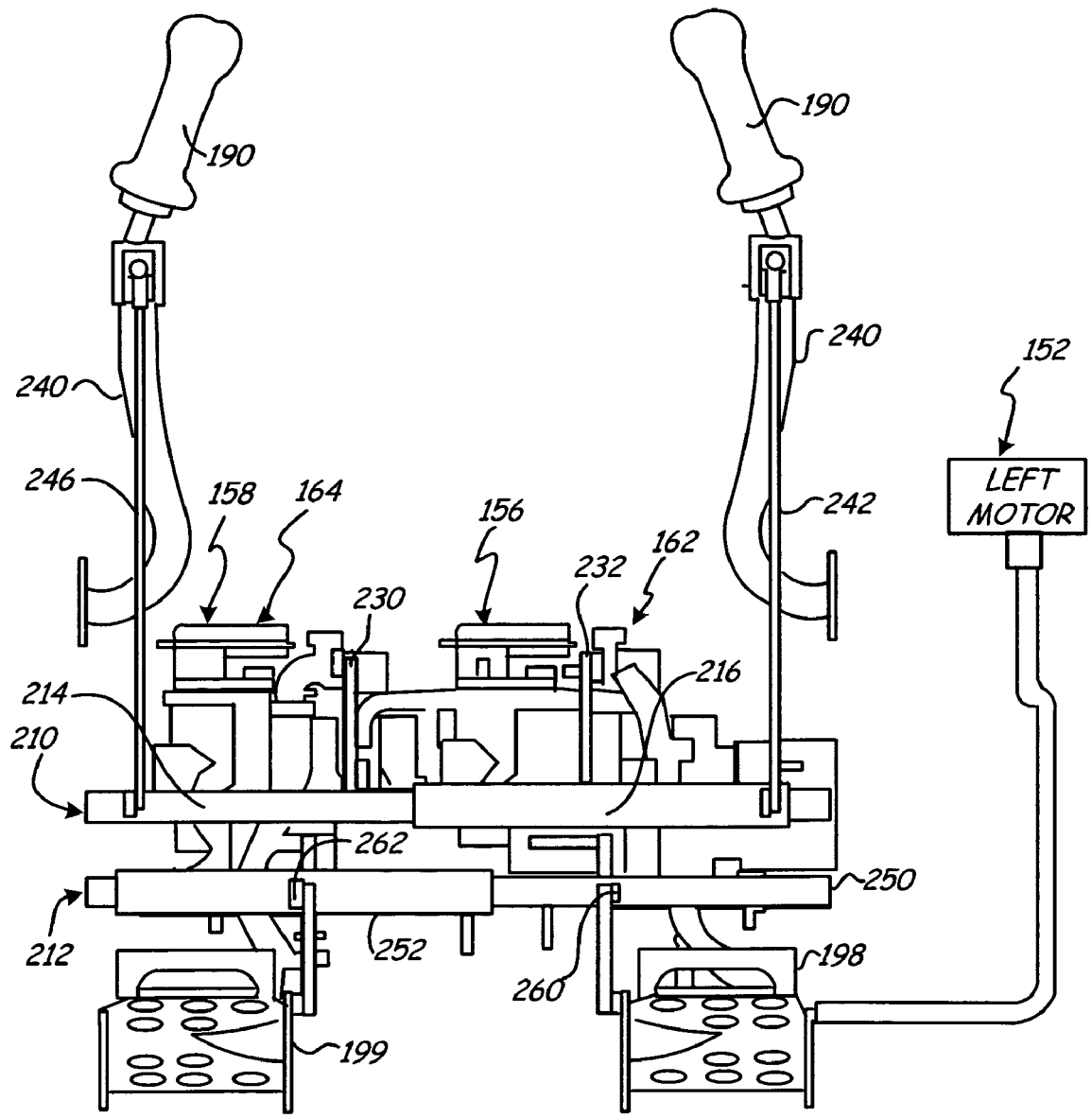
Figure 8:
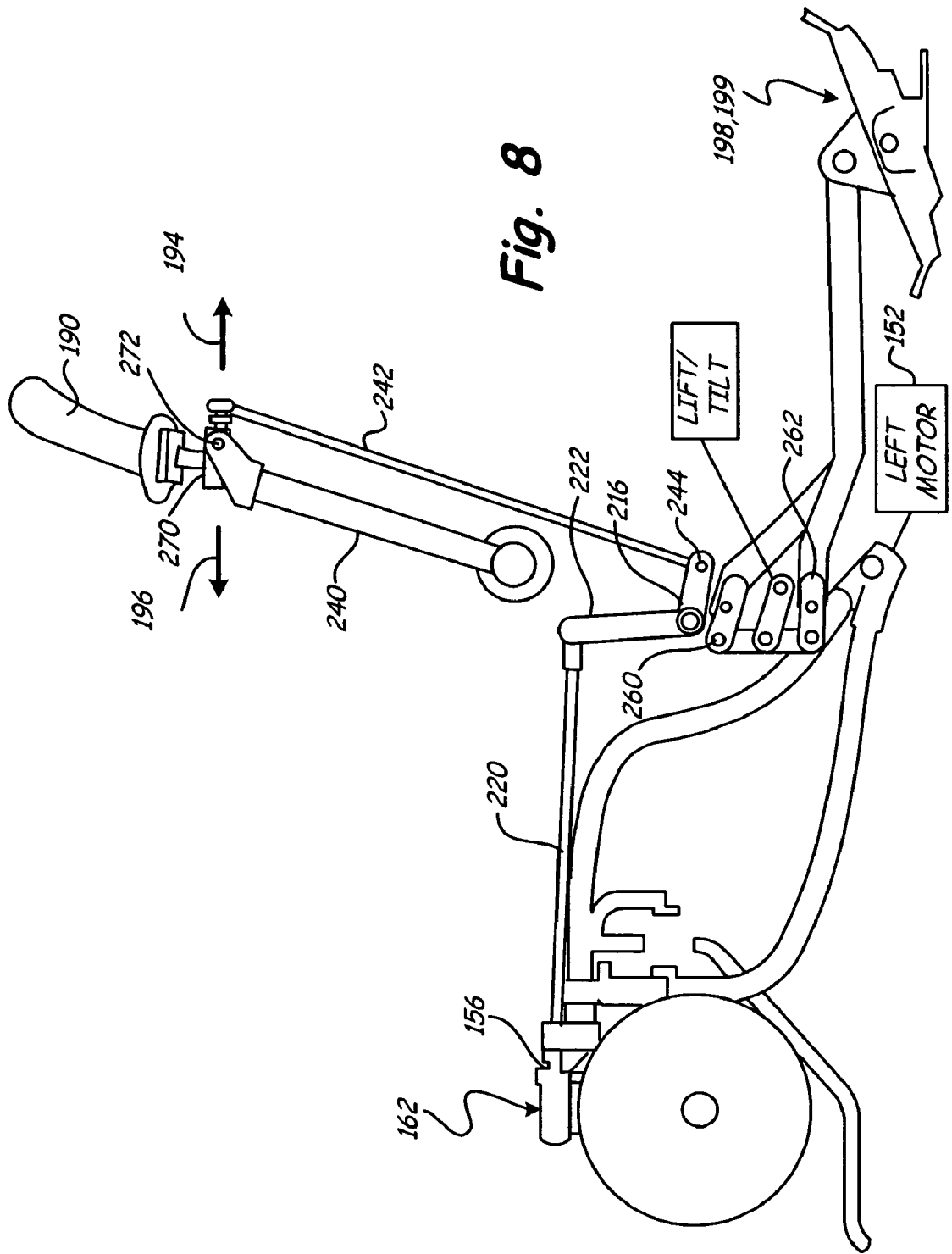

FIGS. 6-8 illustrate an embodiment of the universal linkage assembly 200 adapted to interface with joysticks 190, 192 and foot pedals 198, 199 for operating drive, steer, lift and tilt functions of a power machine. As shown, the universal linkage assembly 200 includes a drive interface 210 for drive and steer functions and a power interface 212 for lift and tilt functions. In the embodiment shown, the universal drive interface 210 includes a drive shaft having an inner cylindrical body 214 and an outer cylindrical sleeve 216 rotatable about the inner cylindrical body 214. Pumps 156 and 158 are formed in block 218.

As shown, the outer cylindrical sleeve 216 is coupled to the left control (or swashplate) 162 to control the magnitude and direction of flow of hydraulic fluid from pump 156 to the left drive motor 152 through link rod 220 attached to the outer cylindrical sleeve 216 at link attachment 222. The inner cylindrical body 214 is coupled to the control 164 to control the direction and magnitude of flow of hydraulic fluid from pump 158 to the right drive motor 154 through link rod 228 attached to the inner cylindrical body 214 at link attachment 230. Rotation of the inner cylindrical body 214 linearly moves link rod 228 to adjust control 164 to control the magnitude and direction of flow of hydraulic fluid from pump 158 and rotation of the outer cylindrical sleeve 216 linearly moves link rod 220 to adjust control 162 to control the direction and magnitude of hydraulic fluid flow from pump 156.

Left and right joysticks 190, 192 are coupled to the inner cylindrical body 214 and outer cylindrical sleeve 216 respectively to rotate the inner cylindrical body 214 and outer cylindrical sleeve 216 to operate controls 162, 164 as previously described. In the embodiment shown, joysticks 190, 192 are rotationally coupled to posts 240 fixed to the frame of the power machine to move in the forward and aft directions 194, 196.

Left joystick 190 is coupled to the outer cylindrical sleeve 216 through link rod 242 and drive attachment 244 and right joystick 192 is coupled to the inner cylindrical body 214 through link rod 246 and drive attachment 248. Forward and aft movement of the joysticks in the forward and reverse directions 194, 196 linearly moves rods 242, 246 to rotate the outer cylindrical sleeve 216 and the inner cylindrical body 214, respectively to control left and right pumps 156, 158 as previously described.

Similarly, in the illustrated embodiment, the power interface includes a power shaft having an inner cylindrical body 250 rotationally coupled to the frame and an outer cylindrical sleeve 252 rotatable about the inner cylindrical body 250 to operate lift and tilt functions of the power machine. For example in the illustrated embodiment, the inner cylindrical body 250 is coupled to the lift valve at attachment 254 to raise and lower the boom or arms of the power machine through a linkage (not shown) via rotation of the inner cylindrical body 250. The outer cylindrical sleeve 252 is coupled to the tilt valve 168 at attachment 256 to adjust tilt through linkage (not shown) via rotation of the outer cylindrical sleeve 252.

In the illustrated embodiment, the inner cylindrical body 250 and the outer cylindrical sleeve 252 are rotated or operated via the left and right foot pedals 198, 199. In particular, as shown, left pedal 198 is connected to the inner cylindrical body 250 through attachment 260 and the right foot pedal 199 is connected to the outer cylindrical sleeve 252 through attachment 262.

FIG. 8 is a side view of left joystick 190 illustrating an interconnect between joystick 190 and link rod 242 connected to outer cylindrical sleeve 216 of the drive shaft. As shown, left joystick 190 is coupled to the link rod 242 through interconnect block 270. Interconnect block 270 is rotationally coupled to post 240 to rotate about axis 272. The interconnect block 270 rotates about axis 272 via forward and aft movement of joystick 190. As shown, link rod 242 is coupled to the interconnect block 270 at a location spaced from axis 272. Thus, forward and aft movement of joystick 190 rotates block 270 to linearly move rod 242 to rotate the outer cylindrical sleeve 216 in a clockwise or counterclockwise direction to control fluid flow to hydraulic motor 152 via pump 156 through link rod 220 and control 162.

Similarly, joystick 192 (not shown in FIG. 7) is coupled to link rod 246 through an interconnect block 270 rotationally coupled to post 240 as previously described to rotate the inner cylindrical body 214 via forward and aft movement of the right joystick 192.

In the control pattern shown, both joysticks 190, 192 are moved in a forward direction for forward drive and aft direction for reverse drive. To steer, joysticks 190, 192 are moved independently to impart a differential motion to the left and right wheels 142, 148. Thus, as described and as shown in FIGS. 6-8, movement of joysticks 190, 192 in the forward and aft directions rotates the inner cylindrical body 214 and outer cylindrical sleeve 216 to drive and steer the power machine through linkages or link rods 220 and 228.

Figure 9:
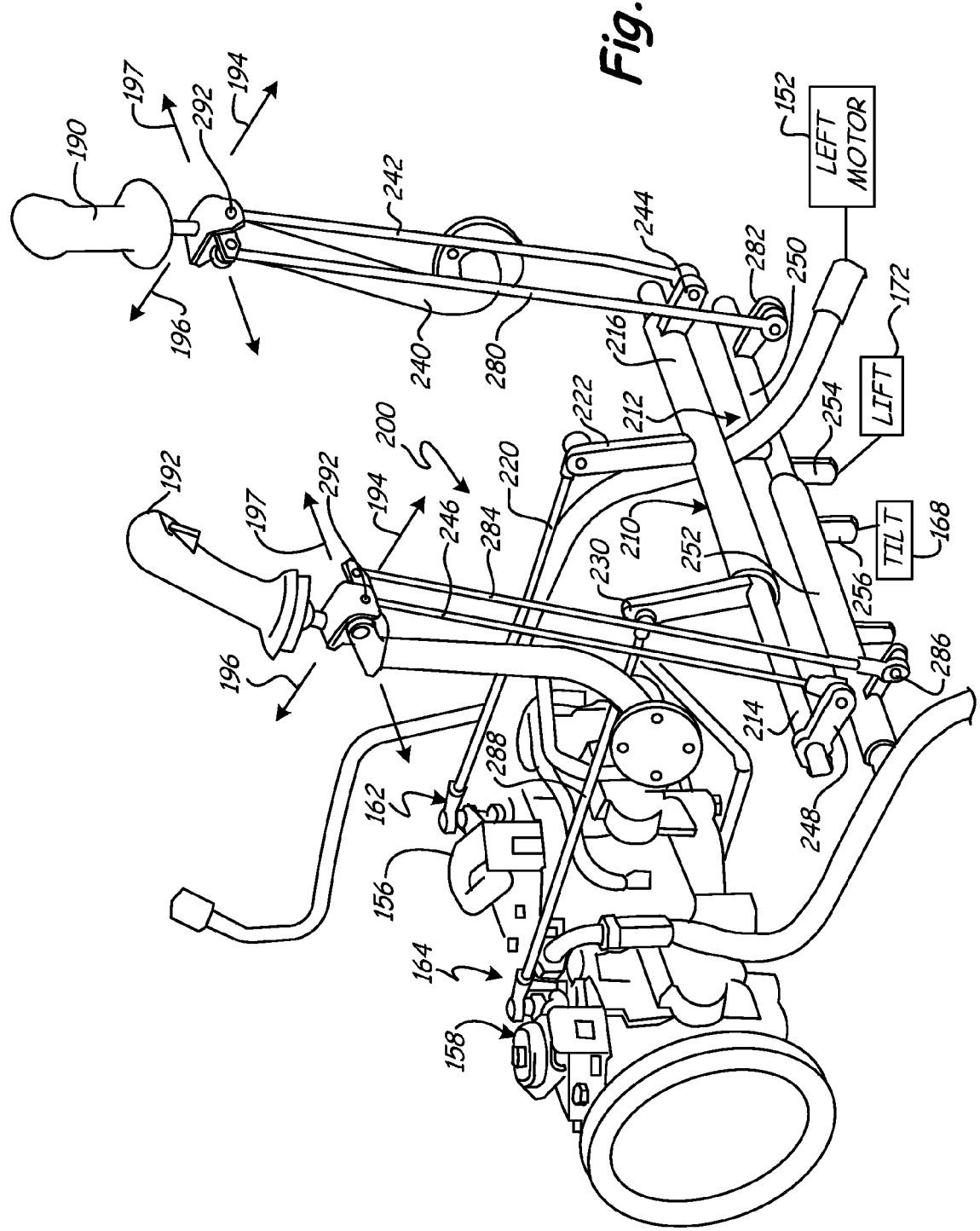
FIGS. 9-11 illustrate the embodiment of the universal linkage assembly of FIGS. 6-8 adapted to implement the control pattern illustrated in FIG. 4.
Figure 10:
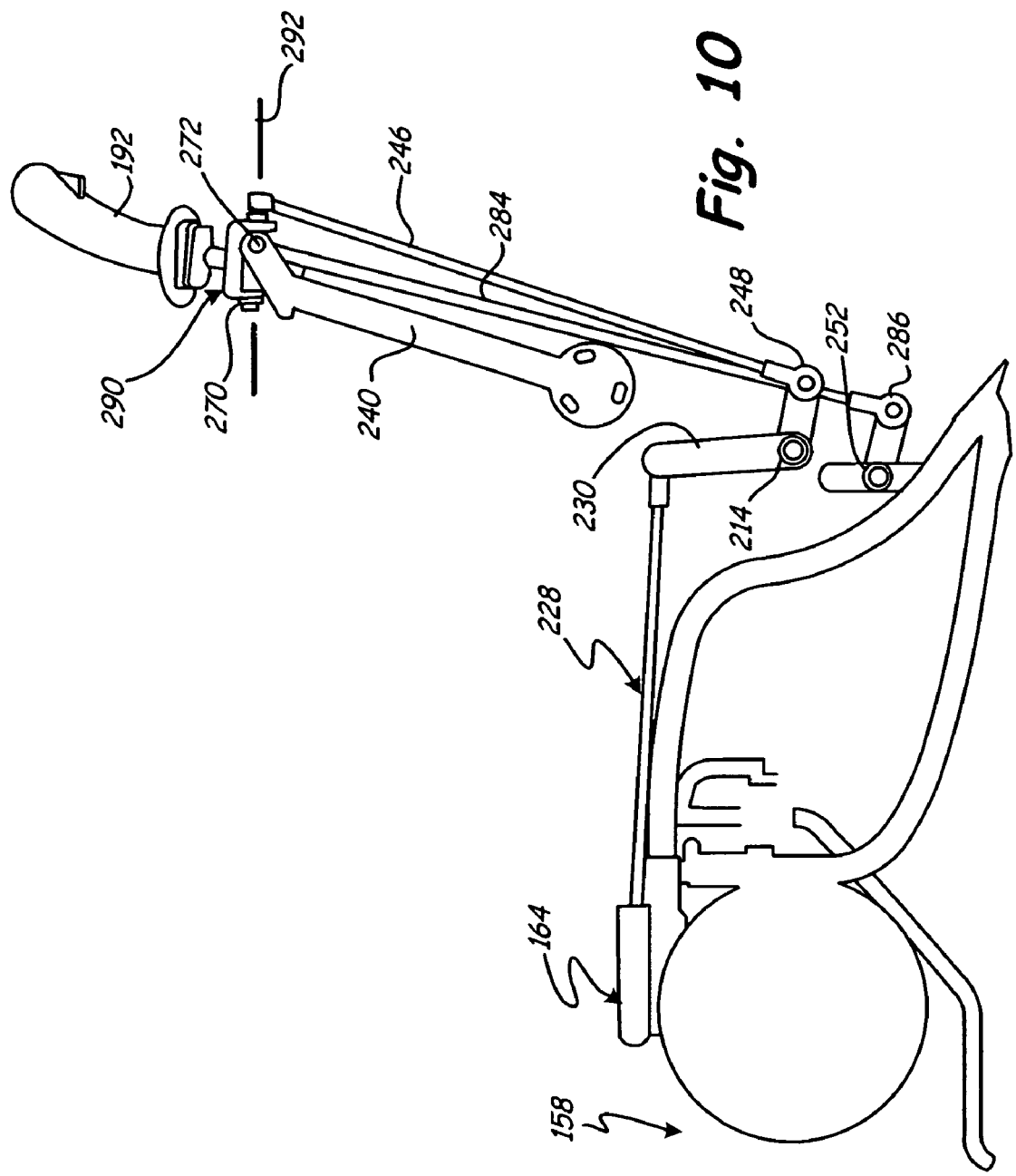
Figure 11:
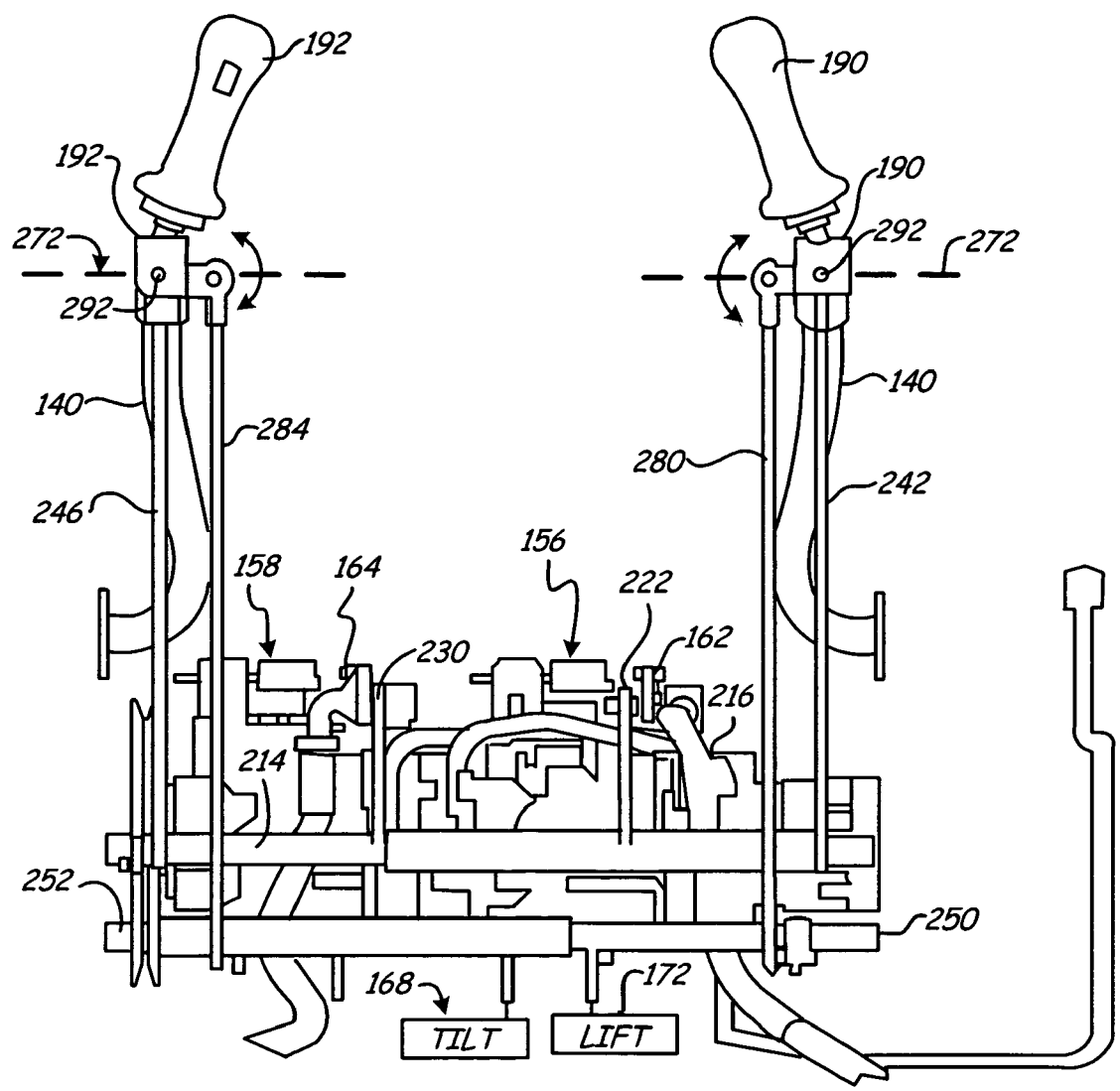

FIGS. 9-11 illustrate the embodiment of the universal linkage assembly 200 previously illustrated in FIGS. 6-8 adapted to provide an interface for an alternate control pattern similar to that illustrated in FIG. 4. As previously described, rotation of the outer cylindrical sleeve 216 and inner cylindrical body 214 operates controls 162, 164 to operate the left and right drive motors 152, 154 (not shown) and rotation of the inner cylindrical body 250 and outer cylindrical sleeve 252 operate lift and tilt functions. Similar to the embodiment illustrated in FIGS. 6-8, the outer cylindrical sleeve 216 and inner cylindrical body 214 are rotated through joysticks 190, 192 through link rods 242, 246.

Instead of foot pedals 198, 199 however, in the illustrated control pattern, the inner cylindrical body 250 and outer cylindrical sleeve 252 of the power shaft are also rotated or controlled through joysticks 190, 192. As shown, the left 190 joystick is coupled to the inner cylindrical body 250 through link rod 280 at attachment 282 and the right joystick 192 is coupled to the outer cylindrical sleeve 252 through link rod 284 at attachment 286. Transverse movement of the joysticks 190, 192 in the transverse direction 197 linearly moves link rods 280, 284 to rotate the inner cylindrical body 250 and outer cylindrical sleeve 252 to operate lift and tilt functions or other functions of the machine.

FIG. 10 is a side view of the right joystick 192 illustrating interface between joystick 192 and link rod 246 for drive and link rod 284 for tilt. As shown in FIG. 10, joystick 192 is coupled to interconnect block 270 through a floating bracket 290. Bracket 290 is rotatably coupled to block 270 to rotate about axis 292. Similarly, joystick 190 (not shown in FIG. 10) is coupled to block 270 through floating bracket 290. Transverse movement of joysticks 190, 192 imparts rotation to the floating bracket 290 about axis 292. As previously described, drive rods 242, 246 are aligned with axis 292 and are coupled to block 270 or interconnect at a location spaced from axis 272 so that rotation about axis 272 linearly moves link rods 242, 246 (only rod 246 is shown in FIG. 10) to control hydraulic fluid flow through rotation of the inner cylindrical body 214 and outer cylindrical sleeve 216 of the drive shaft.

Rods 280, 284 (only rod 284 is shown in FIG. 10) are coupled to the joystick interface in alignment with axis 272 at a location spaced from axis 292 as shown in FIG. 11. Movement of joysticks 190, 192 in the transverse direction 197 thus rotates the interconnect or bracket 290 about axis 292 to linearly move rods 280, 284 to rotate the inner cylindrical body 250 and outer cylindrical sleeve 252 of the power shaft for operating lift and tilt functions as previously described.

Thus as illustrated in FIGS. 9-11, movement of the joysticks 190, 192 in the forward and aft directions 194, 196 rotates the interconnect about axis 272, to linearly actuate rods 242, 246 to rotate one or both of the inner cylindrical body 214 and/or outer cylindrical sleeve 216 to drive and/or steer the power machine. Movement of the joysticks 190, 192 in the transverse direction 197 rotates the interconnect about axis 292 to linearly actuate rods 280, 284 to rotate one or both of the inner cylindrical body 250 or outer cylindrical sleeve 252 to control lift and tilt functions.

Although, in the embodiment shown, the outer cylindrical sleeve 216 is coupled to the left joystick 190 and left drive assembly or motor 152 and the inner cylindrical body 214 is coupled to the right joystick 192 and right drive assembly or motor 150, the outer cylindrical sleeve 216 can alternatively be coupled to the right joystick 192 and right drive assembly and the inner cylindrical body 214 can be coupled to the left joystick 190 and left drive assembly. Further in an alternate embodiment, outer cylindrical sleeve 252 can be coupled to the left joystick 190 and lift assembly 172 and the inner cylindrical body 250 can be coupled to the right joystick 192 and tilt assembly 168.

Figure 12:
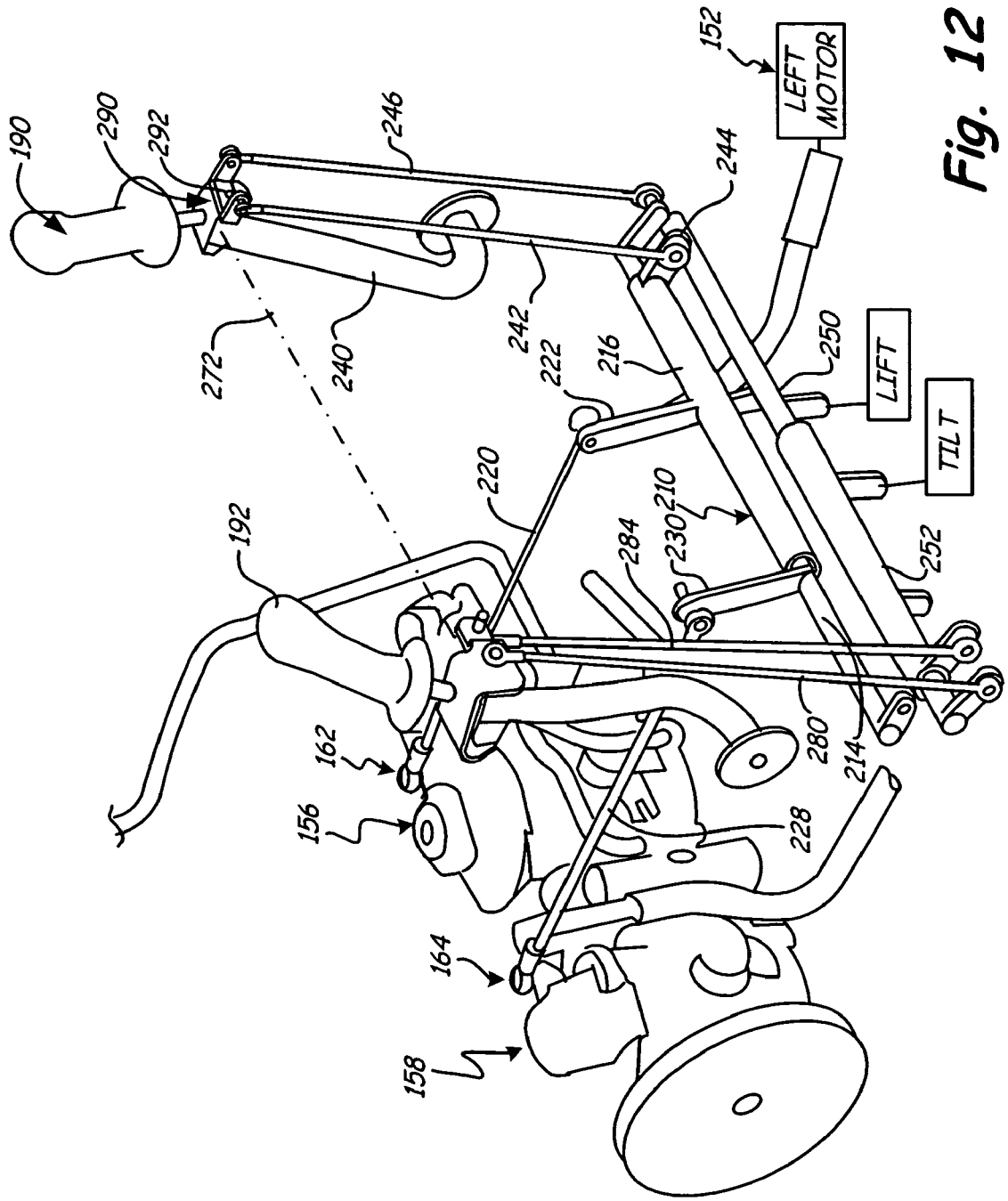
FIGS. 12-14 illustrate the embodiment of the universal linkage assembly of FIGS. 6-8 adapted to implement the control pattern illustrated in FIG. 3.
Figure 13:
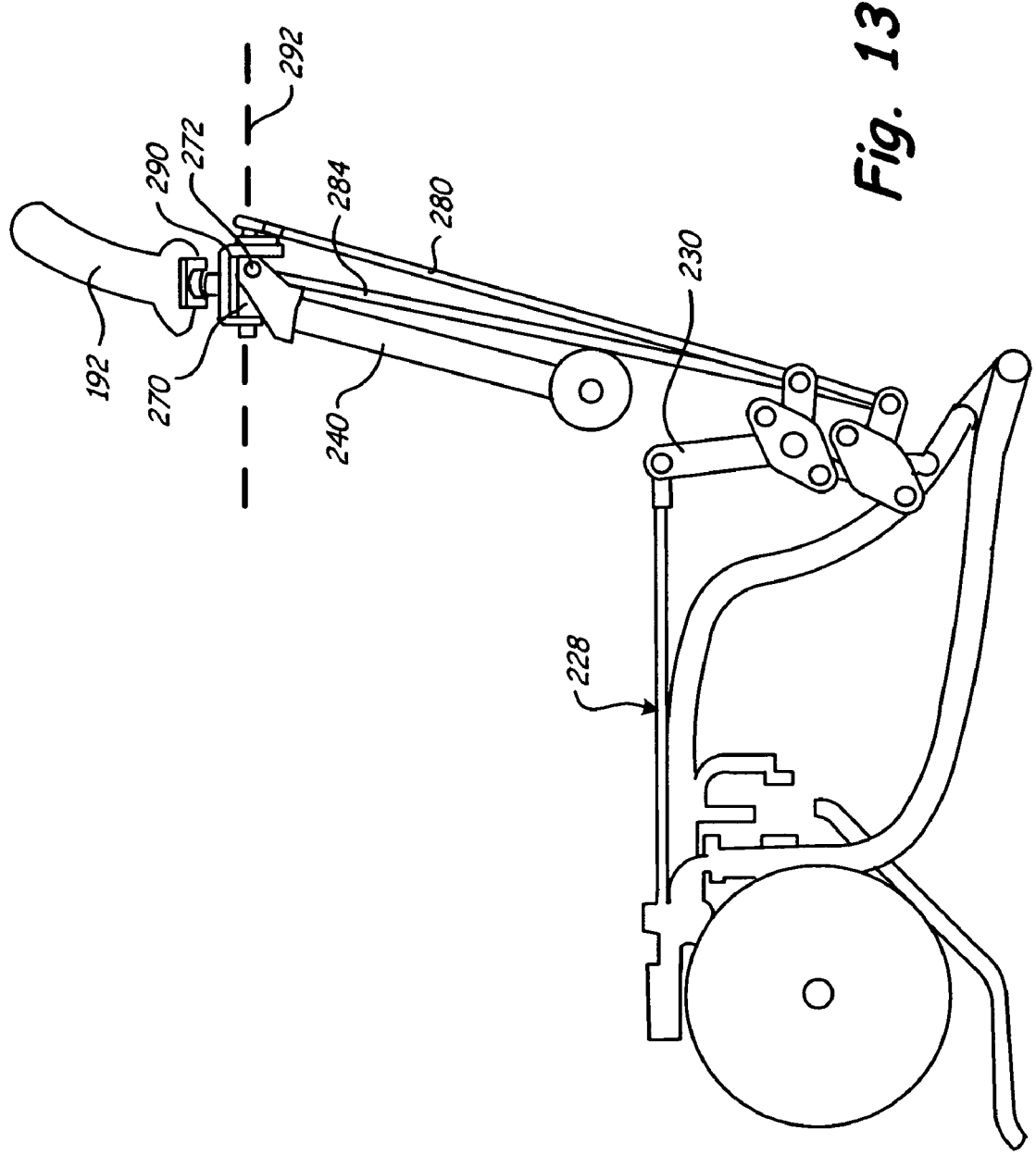
Figure 14:
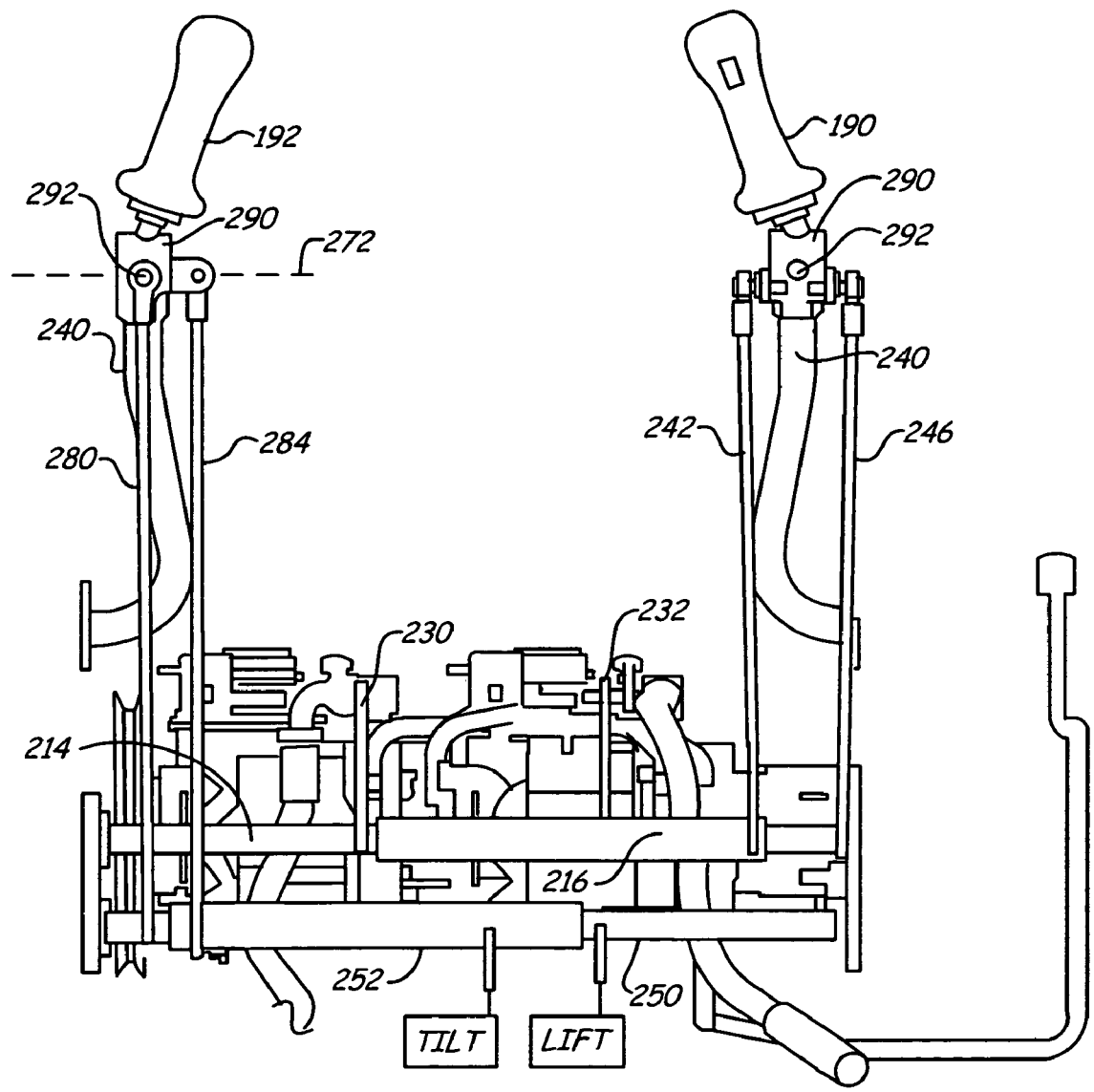

FIGS. 12-14 illustrate the universal linkage assembly of FIGS. 6-11 adapted to provide an interface for a pattern similar to that shown in FIG. 3 where the drive and steer functions are controlled through the left joystick 190 and lift and tilt functions are controlled through the right joystick 192. As shown in FIG. 11, the inner cylindrical body 214 and outer cylindrical sleeve 216 of the drive shaft are rotated through link rods 242, 246 coupled to the left joystick 190 and the inner cylindrical body 250 and outer cylindrical sleeve 252 of the power shaft are rotated through link rods 280, 284 coupled to the right joystick 192.

In the universal linkage shown in FIGS. 6-14, a length of the inner cylindrical bodies 214, 250 is longer than the outer cylindrical sleeves 216, 252 to form a left portion extending beyond an end of the cylindrical sleeve 216, 252 and a right portion extending beyond the other end of the outer cylindrical sleeve 216, 252 to provide a link attachment to the inner cylindrical body 214, 250 on either the left side or right side to interface with either the right or left joysticks 190, 192.

In particular, the link rod 246 can be connected to the right portion of the inner cylindrical body 214 and rotated by the right joystick 192 as shown in FIG. 6 or connected to the left portion of the inner cylindrical body 214 and rotated by the left joystick 190 as illustrated in FIG. 12. As shown, the outer cylindrical sleeve 216 includes a left attachment to connect to the left joystick 190 through rod 242 to control the left drive motor 152. Rod 246 coupled to the inner cylindrical body 214 can be connected to either the left joystick 190 so that both the left and right drive motors 152, 154 are operated through the same joystick or alternatively, rod 246 can be connected to right joystick 192 so that left and right drive 152, 154 are controlled through separate joysticks for the control pattern illustrated in FIG. 4.

Similarly, rod 280 can be connected to the left portion of the inner cylindrical body 250 and rotated by the left joystick 190 as shown in FIG. 9 or connected to the right portion of the inner cylindrical body 250 and rotated by the right joystick 192 as illustrated in FIG. 12. As shown, the outer cylindrical sleeve 252 includes a right attachment to connect to the right joystick 192 through rod 284 to control tilt (in contrast to the left joystick 190 that is coupled to the outer cylindrical sleeve 216 of the drive shaft). Rod 280 is coupleable to either a left or right attachment of the inner cylindrical body 250 to connect to either the right joystick 192 so that both lift and tilt are operated through the same joystick as illustrated in FIG. 3 or to connect to the left joystick 190 so that the lift and tilt are operated via separate joysticks 190, 192 as illustrated in FIG. 4.

Although in FIG. 12, both rods 242, 246 are coupled to the left joystick 190 and rods 280, 284 are coupled to the right joystick 192, application is not limited to the illustrated embodiment and alternatively rods 242, 246 can be connected to the right joystick 192 and rods 280, 282 connected to the left joystick 190.

As cooperatively shown in FIG. 12, rods 242, 246 are connected to the interconnect forward of the axis 272 so that forward and aft movement in direction 194, 196 of joystick 190 linearly moves rods 242, 246 to rotate both the inner cylindrical body 214 and outer cylindrical sleeve 216 to provide forward and aft motion to the power machine or vehicle. As shown in FIG. 12, rods 242, 246 are coupled to the interconnect at locations spaced from axis 292 so that transverse movement of joystick 190 in the direction 197 rotates the bracket 290 to actuate one of the rods 242, 246 to impart a steer motion through rotation of the inner cylindrical body 214 or outer cylindrical sleeve 216.

As shown in FIG. 13, rods 280, 284 connected to the inner cylindrical body 250 and outer cylindrical sleeve 252 of the power shaft are coupled to the right joystick 192 for lift and tilt control. Rod 280 is connected to the interconnect at a location spaced from axis 272 (not shown in FIG. 13) so that forward/aft motion of the joystick 192 rotates the linkage block 270 about axis 272 to rotate the inner cylindrical body 250 to control lift.

As shown in FIG. 14, rod 284 is coupled to the interconnect spaced from rotation axis 292 so that transverse movement of the joystick 192 imparts linear movement to rod 284 via rotation of the interconnect about axis 292 to rotate the outer cylindrical sleeve 252 to control tilt. Alternatively, the left joystick 190 can be adapted to control lift and tilt function and the right joystick 192 can be adapted to control drive and steer functions and application is not limited to the particular connections shown.

Although the present invention has been described with reference to preferred embodiments, workers skilled in the art will recognize that changes may be made in form and detail without departing from the spirit and scope of the invention.

What is claimed is:

1. A universal linkage assembly comprising:
    a first linkage assembly comprising a first inner cylindrical body and a first outer cylindrical sleeve rotatable about the first inner cylindrical body and the first inner cylindrical body extending through a channel of the first outer cylindrical sleeve and the first inner cylindrical body having a first portion that extends beyond a first end of the first outer cylindrical sleeve and a second portion that extends beyond a second end of the first outer cylindrical sleeve;
    a first control linkage coupleable to the first outer cylindrical sleeve and to a first joystick to operably connect the first joystick to the first outer cylindrical sleeve to impart a rotational input to the first outer cylindrical sleeve;
    a second control linkage coupleable to the first inner cylindrical body and a second joystick to impart a rotation to the first inner cylindrical body;
    a second linkage assembly comprising a second inner cylindrical body and a second outer cylindrical sleeve rotatable about the second inner cylindrical body and the second inner cylindrical body extending through a channel of the second outer cylindrical sleeve and the second inner cylindrical body having a first portion that extends beyond a first end of the second outer cylindrical sleeve and a second portion that extends beyond a second end of the second outer cylindrical sleeve;
    a third control linkage coupleable to the second outer cylindrical sleeve of the second control linkage assembly and to a first foot pedal to operably connect the first foot pedal to the second outer cylindrical sleeve to impart a rotational input to the second outer cylindrical sleeve; and
    a fourth control linkage coupleable to the second inner cylindrical body of the second linkage assembly and to a second foot pedal to operably connect the second foot pedal to impart a rotational input to the second inner cylindrical body of the second linkage assembly.

2. The universal linkage assembly of claim 1 wherein the first inner cylindrical body is operably coupled to one of a left drive component or a right drive component of a power machine and the first outer cylindrical sleeve is coupled to the other of the left drive component or the right drive component of the power machine.

3. The universal linkage assembly of claim 2 wherein the left and right drive components comprise at least one of a drive pump, drive motor or control valve.

4. The universal linkage assembly of claim 1 wherein the second inner cylindrical body is operably coupled to one of a lift assembly or tilt assembly of a power machine and the second outer cylindrical sleeve is coupled to the other of the lift assembly or the tilt assembly of the power machine.

5. The universal linkage assembly of claim 1 wherein the first or second inner cylindrical bodies of the first and second linkage assemblies include a first linkage attachment at the first portion and a second linkage attachment at the second portion of the first and second inner cylindrical bodies to connect the second control linkage and the fourth control linkage to the first and second inner cylindrical bodies.

6. The universal linkage assembly of claim 1 in combination with a power machine comprising:
    a first drive assembly wherein the first outer cylindrical sleeve is operably coupled to the first drive assembly through a first drive linkage and a second drive assembly wherein the first inner cylindrical body operably is coupled to the second drive assembly through a second drive linkage.

7. The universal linkage assembly in combination with the power machine of claim 6 and further comprising:
    a lift assembly operable to raise and lower a boom assembly;

a tilt assembly operable to adjust an orientation of an implement or attachment;

and the lift assembly being connectable to one of the second inner cylindrical body or the second outer cylindrical sleeve and the tilt assembly being connectable to the other of the second inner cylindrical body and the second outer cylindrical sleeve.

8. The universal linkage assembly of claim 1 wherein the first joystick is in one of a right or left position and the second joystick is in the other of the right or left position and the first foot pedal is in the other of the right or left position and the second foot pedal is in the one of the right or left position.

9. A universal linkage assembly comprising an inner cylindrical body and an outer cylindrical sleeve rotatable about the inner cylindrical body and the inner cylindrical body extending through a channel of the outer cylindrical sleeve and the inner cylindrical body having a first portion that extends beyond a first end of the outer cylindrical sleeve and a second portion that extends beyond a second end of the outer cylindrical sleeve;

a first operating component coupled to the outer cylindrical sleeve through a first component linkage and a second operating component coupled to the second portion of the inner cylindrical body through a second component linkage; and first and second joysticks; and the outer cylindrical sleeve and the inner cylindrical body are both coupleable to the first joystick through a first control linkage connected to the outer cylindrical sleeve, and a second control linkage connected to the first portion of the inner cylindrical body wherein the first and second control linkages are both connectable to the first joystick through an interconnect assembly rotatable about a first axis and a second axis transverse to the first axis to impart rotation to the outer cylindrical sleeve and the inner cylindrical body through motion of the first joystick.

10. The universal linkage assembly of claim 9 wherein the first control linkage is connected to the interconnect assembly in alignment with the first axis at a location spaced from the second axis and the second control linkage is connected to the interconnect assembly in alignment with the second axis at a location spaced from the first axis.

11. The universal linkage assembly of claim 9 wherein the first operating component is a first drive assembly component and the second operating component is a second drive assembly component and first and second control linkages are connected to the interconnect assembly at a location spaced from the first axis on opposed sides of the second axis and the first joystick is movable in one direction to impart concurrent rotation of the inner cylindrical body and the outer cylindrical sleeve to impart forward or reverse motion to a power machine or vehicle and movable in another direction to impart rotation of one of the inner cylindrical body or the outer cylindrical sleeve to impart steer motion to the power machine or vehicle.

12. The universal linkage assembly of claim 9 wherein the inner cylindrical body and outer cylindrical sleeve form a first linkage assembly and comprising a second linkage assembly comprising a second inner cylindrical body and a second outer cylindrical sleeve rotatable about the second inner cylindrical body and the second inner cylindrical body extending through a channel of the second outer cylindrical sleeve and the second inner cylindrical body having a first portion that extends beyond a first end of the second outer cylindrical sleeve and a second portion that extends beyond a second end of the second outer cylindrical sleeve and the second joystick is coupleable to the second outer cylindrical sleeve and the second inner cylindrical body through third and fourth control linkages.

13. An assembly comprising:

a first inner cylindrical body and a first outer cylindrical sleeve rotatable about the first inner cylindrical body and the first inner cylindrical body extending through a channel of the first outer cylindrical sleeve and the first inner cylindrical body having a first portion that extends beyond a first end of the first outer cylindrical sleeve and a second portion that extends beyond a second end of the first outer cylindrical sleeve;

a second inner cylindrical body and a second outer cylindrical sleeve rotatable about the second inner cylindrical body and the second inner cylindrical body extending through a channel of the second outer cylindrical sleeve and the second inner cylindrical body having a first portion that extends beyond a first end of the second outer cylindrical sleeve and a second portion that extends beyond a second end of the second outer cylindrical sleeve;

a first linkage operably connecting a first input device to the first outer cylindrical sleeve and a second linkage operably connecting the first input device to one of the first or second inner cylindrical bodies; and a third linkage operably connecting a second input device to the second outer cylindrical sleeve and a fourth linkage operably connecting the second input device to the other of the first or second inner cylindrical bodies.

14. The assembly of claim 13 wherein the second linkage operably connects the first input device to the first inner cylindrical body and the fourth linkage operably connects the second input device to the second inner cylindrical body.

15. The assembly of claim 14 wherein the second linkage is connected to the first portion of the first inner cylindrical body and the fourth linkage is connected to the second portion of the second inner cylindrical body and comprising a first operating component coupled to the first outer cylindrical sleeve through a first control linkage, a second operating component coupled to the second portion of the first inner cylindrical body through a second control linkage, a third operating component coupled to second outer cylindrical sleeve via a third control linkage and a fourth operating component coupled to the first portion of the second inner cylindrical body through a fourth control linkage.

16. The assembly of claim 13 wherein the second linkage operably connects the first input device to the second inner cylindrical body and the fourth linkage operably connects the second input device to the first inner cylindrical body.

17. The assembly of claim 16 wherein the second linkage is connected to the first portion of the second inner cylindrical body and the fourth linkage is connected to the second portion of the first inner cylindrical body and comprising a first operating component connected to first outer cylindrical sleeve through a first control linkage, a second operating component coupled to the second portion of the first inner cylindrical body through a second control linkage, a third operating component coupled to the second outer cylindrical sleeve through a third control linkage and a fourth operating component coupled to the first portion of the second inner cylindrical body through a fourth control linkage.

18. The assembly of claim 13 wherein the first input device includes a joystick movable in a forward, reverse and lateral direction and the second control linkage operably connects the joystick to the first inner cylindrical body and movement of the joystick in the forward and reverse directions imparts rotation to both the first inner cylindrical body and the first outer cylindrical sleeve and movement of the joystick in a first side direction imparts rotation to the first inner cylindrical body and movement of the joystick in a second side direction opposite to the first side direction imparts rotation to the first outer cylindrical sleeve.

19. The assembly of claim 18 in combination with a drive assembly for a power machine including a first drive component and a second drive component and the first drive component is operably coupled to first inner cylindrical body and the second drive component is operably coupled to first outer cylindrical sleeve.

20. The assembly of claim 13 wherein the second inner cylindrical body and the second outer cylindrical sleeve are operable coupled to a lift assembly and a tilt assembly of a power machine wherein rotation of the second inner cylindrical body and the second outer cylindrical sleeve control lift and tilt of an implement or bucket.

* * * * *